(12) United States Patent
Shigetomi et al.

(10) Patent No.: US 10,336,020 B2
(45) Date of Patent: Jul. 2, 2019

(54) HEAT DISPERSION DEVICE AND REPAIR AND JOINING METHODS

(71) Applicant: MITSUBISHI AIRCRAFT CORPORATION, Aichi (JP)

(72) Inventors: Toshikazu Shigetomi, Tokyo (JP); Masayoshi Suhara, Tokyo (JP); Morimasa Ishida, Aichi (JP); Shuhei Muto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 843 days.

(21) Appl. No.: 14/568,279

(22) Filed: Dec. 12, 2014

(65) Prior Publication Data

US 2015/0217523 A1 Aug. 6, 2015

(30) Foreign Application Priority Data

Jan. 31, 2014 (JP) .................................. 2014-16624

(51) Int. Cl.
*B29C 65/00* (2006.01)
*B29C 65/02* (2006.01)
(Continued)

(52) U.S. Cl.
CPC ............ *B29C 73/34* (2013.01); *B29C 35/041* (2013.01); *B29C 73/02* (2013.01); *B29C 73/10* (2013.01);
(Continued)

(58) Field of Classification Search
CPC ..... B29C 65/02; B29C 65/18; B29C 65/4835; B29C 66/71; B29C 66/9161;
(Continued)

(56) References Cited

U.S. PATENT DOCUMENTS 4,352,707 A * 10/1982 Wengler .................. B29C 65/18
156/285
4,814,189 A * 3/1989 Laude-Bousquet .........................
C12G 1/0213
165/46

(Continued)

FOREIGN PATENT DOCUMENTS

JP           S6262740 A      3/1987
JP        2000000950 A      1/2000
(Continued)

OTHER PUBLICATIONS

Japanese Office Action for corresponding Japanese Patent Application No. 2014-016624 dated Oct. 18, 2017.
(Continued)

*Primary Examiner* — Philip C Tucker
*Assistant Examiner* — Brian R Slawski
(74) *Attorney, Agent, or Firm* — Pearne & Gordon LLP

(57) ABSTRACT

The present invention provides a device which can uniformize heat distribution by using an existing heater mat for repairing or joining members. A heat dispersion device includes a bag with a fluid sealed inside, and is disposed on a second surface of a heater mat which has a first surface to be directed toward an object to be heated and the second surface opposite to the first surface. The fluid inside the bag is preferably heated with a heat source.

20 Claims, 6 Drawing Sheets

(51) Int. Cl.

| | |
|---|---|
| *B32B 37/00* | (2006.01) |
| *B32B 38/00* | (2006.01) |
| *B29C 73/00* | (2006.01) |
| *B32B 43/00* | (2006.01) |
| *A63B 39/00* | (2006.01) |
| *A63B 41/00* | (2006.01) |
| *C09J 5/02* | (2006.01) |
| *B29C 65/78* | (2006.01) |
| *B65B 9/00* | (2006.01) |
| *B30B 5/02* | (2006.01) |
| *B30B 5/04* | (2006.01) |
| *B30B 15/34* | (2006.01) |
| *H05B 3/02* | (2006.01) |
| *H05B 3/34* | (2006.01) |
| *H05B 3/50* | (2006.01) |
| *F28F 3/12* | (2006.01) |
| *B29C 73/34* | (2006.01) |
| *B29C 73/10* | (2006.01) |
| *B29C 73/02* | (2006.01) |
| *B29C 35/04* | (2006.01) |
| *B29L 31/30* | (2006.01) |
| *B29C 65/18* | (2006.01) |
| *B29C 65/48* | (2006.01) |

(52) U.S. Cl.
CPC .......... *B29C 65/18* (2013.01); *B29C 65/4835* (2013.01); *B29C 66/8183* (2013.01); *B29C 66/81455* (2013.01); *B29C 66/87* (2013.01); *B29C 66/91431* (2013.01); *B29C 66/91631* (2013.01); *B29C 2035/043* (2013.01); *B29L 2031/3076* (2013.01); *Y10T 156/10* (2015.01)

(58) Field of Classification Search
CPC ........ B29C 66/91421; B29C 66/91631; B29C 66/91651; B29C 66/818; B29C 66/8183; B29C 66/87; B29C 66/721; B29C 66/81455; B29C 66/9141; B29C 66/91411; B29C 66/91431; B29C 73/10; B29C 73/12; B29C 73/34; B29C 73/32; B29C 65/24; B29C 65/30; B64F 5/40; B29L 2031/18; B30B 15/064; F28F 3/12; F28F 3/14; F28F 21/065; F28F 3/00; F28F 13/00; F28F 21/06; F28F 21/062; F28F 21/067; H04J 1/00; H05B 3/34; H05B 3/00; H05B 3/26; H05B 2203/017; Y02E 10/44; F28D 9/04; F28D 9/0081

USPC ....... 156/60, 64, 94, 98, 145, 146, 285, 286, 156/293, 297, 298, 303.1, 307.1, 307.3, 156/349, 378, 499, 580, 583.1, 583.3; 219/200, 221, 227, 228, 243, 520, 528, 219/529, 530, 535, 538, 540; 392/339, 392/441, 443; 165/168, 169, 104.11, 165/104.19, 104.28, 104.31, 46

See application file for complete search history.

(56) References Cited

U.S. PATENT DOCUMENTS

| | | | | |
|---|---|---|---|---|
| 5,835,983 | A * | 11/1998 | McMahen | A61F 7/007 |
| | | | | 219/527 |
| 5,875,282 | A * | 2/1999 | Jordan | A61M 5/44 |
| | | | | 165/170 |
| 6,031,212 | A | 2/2000 | Westerman et al. | |
| 6,270,603 | B1 * | 8/2001 | Westerman | B29C 35/02 |
| | | | | 156/323 |
| 6,409,748 | B1 * | 6/2002 | DeCarlo | A61F 7/007 |
| | | | | 607/112 |
| 6,734,398 | B1 * | 5/2004 | Cecchi | B01L 7/00 |
| | | | | 219/218 |
| 2003/0159219 | A1 * | 8/2003 | Harrison | A61G 7/001 |
| | | | | 5/713 |
| 2009/0294053 | A1 | 12/2009 | Graham | |
| 2011/0180243 | A1 * | 7/2011 | Bera | F28F 3/12 |
| | | | | 165/168 |

FOREIGN PATENT DOCUMENTS

| | | | | |
|---|---|---|---|---|
| JP | 2008089677 A | | 4/2008 | |
| JP | 2010241544 A | | 10/2010 | |
| WO | WO 2011158028 A2 * | | 12/2011 | F24H 1/121 |

OTHER PUBLICATIONS

Japanese Office Action for Application No. 2014-016624 dated Apr. 3, 2018.

\* cited by examiner

HEAT DISPERSION DEVICE AND REPAIR AND JOINING METHODS

BACKGROUND OF THE INVENTION

Field of the Invention

The present invention relates to a heat dispersion device which uniformizes heat distribution during heating of a member formed from a fiber-reinforced plastic (composite material) etc. with a heater mat for repairing or joining the member.

Description of the Related Art

A structural member constituting a fuselage of an aircraft such as a skin can be formed from a fiber-reinforced plastic (FRP) or a metal material.

When a structural member is damaged by lightning or bird striking, etc., the damaged part is removed and the void left is covered with a repair material.

The repair material is formed, for example, from a fiber-reinforced plastic similar to that used for the structural member. In that case, the repair material can be formed from an intermediate material called a prepreg. The prepreg is a material obtained by impregnating a sheet-like fiber base material with a thermosetting resin and keeping it at a low temperature so as to maintain the uncured state.

During the repair, the repair material is disposed on a recessed part of the structural member formed by removal of a damaged part, with a film-like adhesive formed from a thermosetting resin interposed therebetween, and the repair material is heated. The repair is completed when the heat applied cures the thermosetting resins constituting the repair material and the film-like adhesive and the repair material is joined to the structural member.

Here, in the manufacture of the structural member, the structural member is placed in an autoclave device and heated under pressure, to thereby mold the fiber-reinforced plastic with high quality, while in the repair of the structural member, since it is integrated with other structural members, it is difficult to place the structural member in an autoclave device.

For this reason, a heater mat (also called a heater blanket) which locally heats the repair material and the surrounding area is commonly used as a device for heating the repair material.

The heater mat is a rubber member with a built-in heat source such as a nichrome wire, and it has the flexibility to follow the shape of even the curved surface of the structural member.

The heater mat is widely used in various applications for heating a predetermined area of a member, and comes in various sizes.

Other than the heater mat, a device which applies pressure and heat using a fluid has been proposed as a heating device used for repair or joining purposes (U.S. Patent application publication No. 2009/0294053, U.S. Pat. No. 6,031,212). For example, the device according to U.S. Patent No. application publication 2009/0294053 includes a pair of chambers, each storing a fluid, for pressurizing a member held between them from both sides.

Where the thickness of a member to be repaired varies from portion to portion, or where the member is provided with a support member, an accessory, etc., the condition of heat conduction varies depending on the position in the member.

For this reason, even when the temperature of the heat generated is uniform in the plane of the heater mat, it is difficult to uniformize heat distribution, which is important for securing the repair quality.

Here, particularly according to the device of U.S. Patent application publication No. 2009/0294053, although the flow of the fluid can be expected to uniformize the heat distribution, installing the large-sized device with chambers at a position of repair is far from easy.

In this regard, the heater mat is excellent in portability and easy to install at a position of repair.

Moreover, as the heater mat is technically proven and sufficiently reliable, it is widely used.

Accordingly, there is a strong demand for a device which one can use supplementarily in combination with a heater mat to uniformize heat distribution, without introducing a new heating device that replaces a heater mat.

The same problem as that of the repair described above occurs when joining members together with an adhesive containing a thermosetting resin.

Therefore, the present invention aims to provide a device which can uniformize heat distribution using an existing heater mat in order to repair or join a member by heating the resin to cure.

SUMMARY OF THE INVENTION

In order to uniformize heat distribution during the repair using a heater mat, the present inventors use a heat insulating material on the basis of a prior temperature distribution survey (called a heat survey) as will be described below.

As shown in FIG. 8, in the temperature distribution survey, a release film 62 is inserted between the inner peripheral surface of a recessed part 23 formed in a damaged area and a repair material 24 (e.g., prepreg), and the repair material 24 is heated with a heater mat 20, and the temperature is measured with temperature sensors 30 which are installed and embedded at a plurality of positions in the repair material 24 for the survey. The temperature sensors 30 are disposed, for example, at the center and the edge of the surface of the repair material 24 and on the outer periphery of the repair material 24 facing the inner peripheral surface of the recessed part 23.

According to the measurement results of these temperature sensors 30, a heat insulating material 61 (thermal insulation) which prevents heat dissipation is disposed on the heater mat 20 at some positions, and the temperatures are measured again. The heat insulating material 61 is disposed, for example, at positions corresponding to the edge part of the repair material 24.

The temperature measurement is repeated with the different position and size of the heat insulating material 61, until the temperatures measured by the temperature sensors 30 fall within a predetermined temperature range, to determine the most effective position and size of the heat insulating material 61.

A rubber plate etc. can be used as the heat insulating material 61. At positions where the temperature is significantly lower than the surrounding area, a small-sized heater mat may be placed on top of the heater mat 20.

After the preparatory work is thus finished, the repair material 24 is disposed on the recessed part 23 without the release film 62 interposed therebetween, and the heat insulating material 61 is disposed, according to the position and the size determined by the preparatory work, on the heater mat 20 placed on the repair material 24, before the repair material 24 is heated. During the heating, the temperature of the repair material 24 is monitored with the temperature sensors 30 disposed for control and the output of the heater mat 20 is adjusted.

In this way, the preparatory work for the repair is troublesome and takes a lot of time.

Moreover, even when time comes for actual heating after the temperature distribution survey, it is possible that the ambient temperature may have changed since the temperature distribution survey, or the temperature of the repair material 24 may be not uniform due to the influence of removal of the release film 62 or a measurement error during the survey. That is, the repair material is heated to an excessively high temperature due to heat concentration in some portions, while the temperature will not rise sufficiently in other portions.

The repair is not completed until the entire repair material 24 has reached a predetermined curing temperature and the entire thermosetting resin has cured sufficiently.

Having been contrived in view of these circumstances, a heat dispersion device of the present invention includes a bag with a fluid sealed inside, and the device is disposed on a second surface of a heater mat which has a first surface to be directed toward an object to be heated and the second surface opposite to the first surface.

According to the heat dispersion device of the present invention, as the fluid inside the bag propagates the heat while flowing, it is possible to uniformize the heat distribution in an area heated by the heater mat, without disposing a heat insulating material at a predetermined position in the heater mat.

Accordingly, it is possible to raise the temperature of the entire heating area to a temperature required for curing to thereby repair a member, join a member, etc. with high quality by heating with the heater mat.

In addition, it is possible to quickly repair a member, join a member, etc. without requiring the preparatory work of trying the arrangement of the heat insulating material on the basis of the thermal distribution survey.

The heat dispersion device of the present invention may include an internal heat source inside the bag for heating the fluid.

Alternatively, the heat dispersion device of the present invention may be connected with an external heat source for heating the fluid.

If the fluid inside the bag is heated with the internal heat source or the external heat source, the heat generated from the heater mat is not absorbed by the fluid, and the performance of the heater mat can be maintained.

In the heat dispersion device of the present invention, it is preferable that the bag has a circuit in which the fluid circulates.

If a circuit is formed inside the bag, the flow of the fluid is facilitated along the circuit, so that the heat distribution can be efficiently uniformized.

A larger effect is obtained if the circuit has a spiral shape and is configured so as to create a flow which moves toward the inner peripheral side while circling inside the bag and a flow which moves toward the outer peripheral side while circling inside the bag.

It is preferable that the heat dispersion device of the present invention includes a flow forcing part for forcing the fluid to flow.

If the fluid is forced to flow by the flow forcing part, the heat dispersion through the flow of the fluid inside the bag is promoted, so that the heat distribution can be efficiently uniformized.

The bag in the heat dispersion device of the present invention may have a form with a plate-like outline similar to that of the heater mat.

Here, it is preferable that the bag has such a size that it can be placed over substantially the entire second surface of the heater mat, because then the heat distribution can be uniformized through the flow of the fluid inside the bag regardless of the position of a temperature difference in the heating area.

If the bag has the same planar size as the heater mat, the heater mat and the heat dispersion device are easy to store with one on top of the other.

The heat dispersion device of the present invention can be suitably used in combination with a heater mat for joining aircraft members constituting an aircraft or providing an aircraft member with a repair material for repairing the aircraft member.

It is possible to repair a member and join members together by using the heat dispersion device and the heater mat of the present invention.

A repair method of the present invention is a repair method using the above-described heat dispersion device, including the steps of: disposing a repair material containing a resin, which is cured by heating, on a member to be repaired; directing the first surface of the heater mat toward the repair material and covering the repair material with the heater mat; disposing the heat dispersion device on the second surface of the heater mat; and heating the repair material with the heater mat.

In the repair method of the present invention, a repair material containing a prepreg formed from a thermosetting resin and a fiber base material can be used.

The repair method of the present invention can repair a member formed of a fiber-reinforced plastic.

A joining method of the present invention is a joining method using the above-described heat dispersion device, including the steps of: disposing an adhesive containing a resin, which is cured by heating, between a first member and a second member to be joined with each other; disposing the heater mat on at least one of the first member and the second member; disposing the heat dispersion device on the second surface of the heater mat; and heating the adhesive with the heater mat.

The joining method of the present invention can join members formed of a fiber-reinforced plastic.

In the above-described repair method and joining method, it is preferable that, in the heating step, the fluid is heated with a heat source built in the bag or a heat source connected with the heat dispersion device.

It is also preferable that the fluid is forced to flow in the heating step.

The repair method and the joining method of the present invention can be applied to aircraft members constituting an aircraft.

The present invention can be developed into a method for molding a member.

For example, it is also possible to heat a prepreg, which is the material of a member, with a heater mat to thereby mold the member.

It is also possible to dispose a prepreg, which is the material of a second member, on the molded first member and heat the prepreg with the heater mat to thereby mold the second member and at the same time join it to the first member.

Moreover, a member can be molded also by depressurizing the inside of a cavity, where a fiber base material being the material of the member is disposed, to thereby inject a resin into the cavity (VaRTM (Vacuum Assisted Resin Transfer Molding)), and heating the resin with the heater mat to cure.

All of the molding methods described above as examples include the steps of: directing the first surface of the heater mat toward the material of the member and covering the material of the member with the heater mat; disposing the heat dispersion device on the second surface of the heater mat; and heating the material of the member with the heater mat.

According to the present invention, heat distribution can be uniformized by using the combination of the heater mat and the heat dispersion device. Thus, without incurring the cost for introducing a new heating device which contributes to uniform heat distribution, but with an economical device configuration, the present invention allows quick and high-quality repair or joining of a member involving heating.

DETAILED DESCRIPTION OF THE PREFERRED EMBODIMENTS

In the following, an embodiment of the present invention will be described with reference to the accompanying drawings.

Figure 1A:
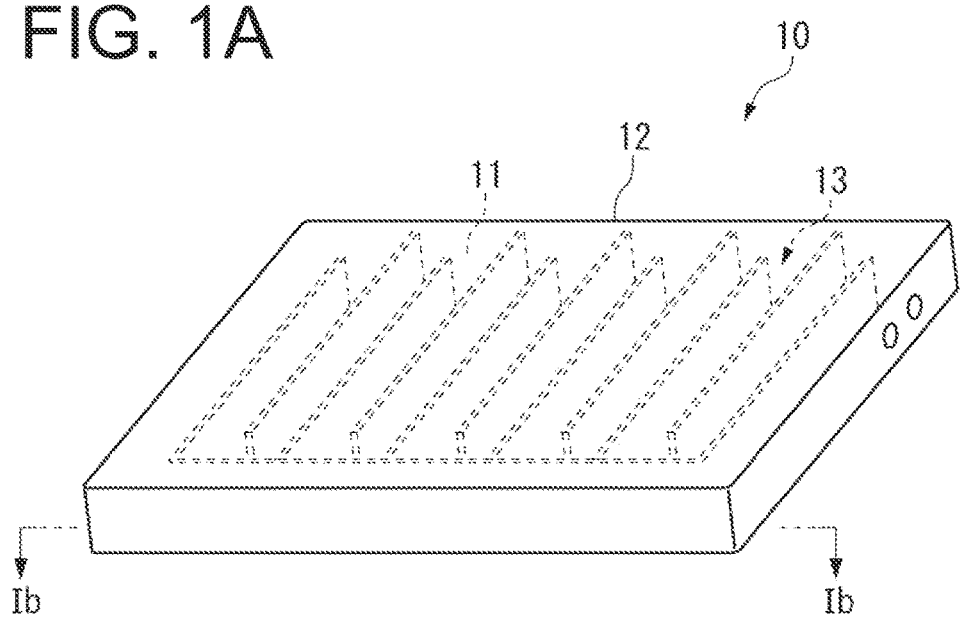
FIG. 1A is an outline perspective view of a heat dispersion device according to an embodiment of the present invention.
Figure 1B:
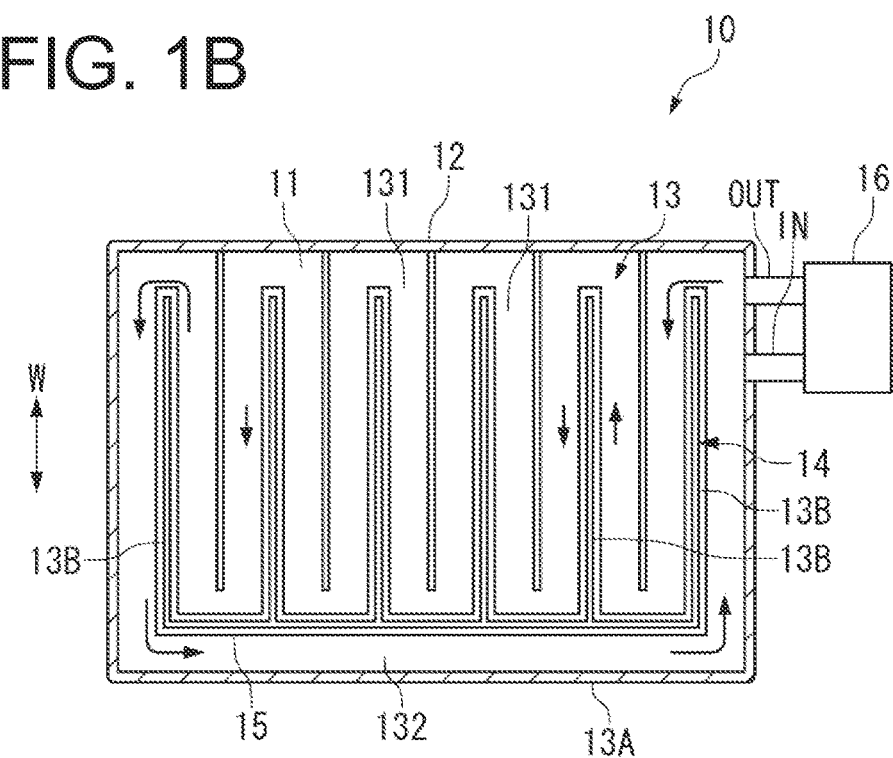
FIG. 1B is a cross-sectional view along the line Ib-Ib of FIG. 1A.

A heat dispersion device 10 shown in FIGS. 1A and 1B is used with a heater mat 20 (FIG. 2A) for repairing a member or joining members together.

In this embodiment, repair of a damaged part of a skin 21 (FIG. 2A) of a wing or a fuselage of an aircraft using the heat dispersion device 10 and the heater mat 20 will be described.

The outline of the repair is to heat a repair material 24 disposed on the damaged part of the skin 21 with the heater mat 20 to thereby cure the thermosetting resin contained in the repair material 24. During this time, the heat dispersion device 10 uniformizes the heat distribution.

The heat dispersion device 10 includes a bag 12 with a fluid 11 sealed inside.

The fluid 11 selected has a boiling point sufficiently higher than the temperature of the heat generated from the heater mat 20 so as not to boil at a high temperature when the heat of the heater mat 20 is conducted to the fluid 11. While a silicone oil is used in this embodiment, other heat medium oils etc. can also be used.

The fluid 11 propagates heat while flowing inside the bag 12.

The bag 12 is formed of a material flexible enough to follow the shape of even a curved surface, and has a rectangular plate-like outline. The bag 12 has sufficient heat resistance relative to the temperature of the heat generated from the heater mat 20. The bag 12 of this embodiment is formed from silicone rubber.

A circuit 13 in which the fluid 11 circulates is formed inside the bag 12.

As shown in FIG. 1B, the circuit 13 has a meandering part 131, which extends from one end side of the bag 12 toward the other end side while meandering in a width direction W, and a return part 132, which returns from the end of the meandering part 131 to the one end side of the bag 12.

The circuit 13 is formed of an outer wall 13A which extends continuously on the four sides of the bag 12, and an inner wall 13B which extends upright along the thickness direction of the bag 12 on the inside of the outer wall 13A. The fluid 11 circulates by passing between the inner walls 13B and between the outer wall 13A and the inner walls 13B.

The bag 12 of this embodiment is molded using a die by dividing it at a position similar to that of the line Ib-Ib of FIG. 1. The die has a form corresponding to the outer wall 13A and the inner walls 13B. The bag 12 is produced by joining the two molded bodies by pressing. The fluid 11 may be sealed inside the bag 12 before the two bodies are joined, or may be sealed into the bag 12 through the hole or the clearance of the bag 12 after the two bodies are joined.

It is not absolutely necessary that the inner walls 13B forming the circuit 13 are formed integrally with the bag 12. It is also possible to form the circuit 13 by providing the inner walls 13B, which are separate from the bag 12, inside the bag 12.

An internal heater 14 for heating the fluid 11 is provided inside the bag 12.

The internal heater 14 is, for example, constituted of a heating wire 15 (shown in FIG. 1B) made of a material having high electric resistance such as nichrome, chromel, or kanthal (registered trademark).

The heating wire 15 can be provided in any form inside the bag 12. In this embodiment, the heating wire 15 meanders along the inner walls 13B so as to extend over substantially the entire surface of the bag 12.

The heating wire 15 generates heat upon receiving a power supply from a power source device through a lead wire (not shown), and gives heat to the fluid 11 by directly coming into contact with it.

Alternatively, the heating wire 15 can also be insert-molded during molding of the bag 12.

The bag 12 is connected on its one end side with a pump 16 which is inserted into the circuit 13 and forces the fluid 11 inside the bag 12 to circulate.

The pump 16 suctions the fluid 11 from the inside of the bag 12 and pushes it out to the inside of the circuit 13.

An outlet passage OUT for discharging the fluid 11 from the inside of the bag 12 to the pump 16, and an inlet passage IN for sending the fluid 11 from the pump 16 to the inside of the bag 12 are provided on the one end side of the bag 12.

Figure 3:
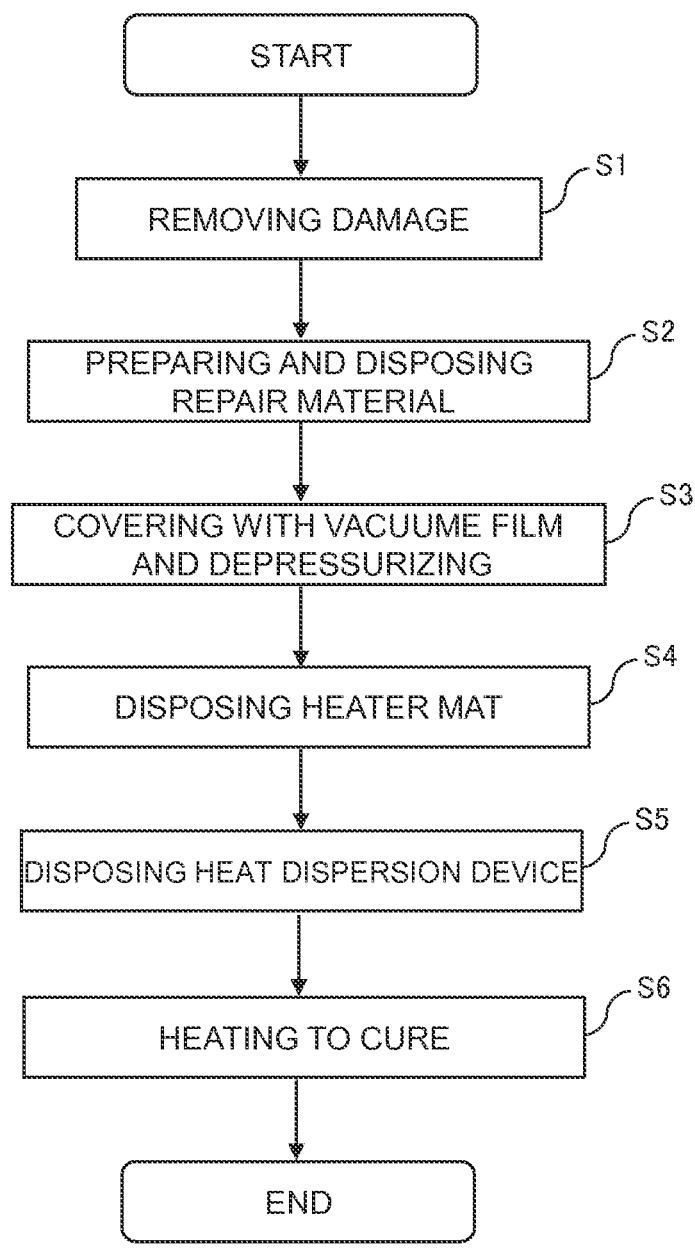
FIG. 3 is a flowchart showing each step of repair.

Next, one example of a procedure for repairing the skin 21 used for a main wing of an aircraft, in the event of damage, using the heater mat 20 and the heat dispersion device 10 will be described with reference to FIG. 3.

Figure 2A:
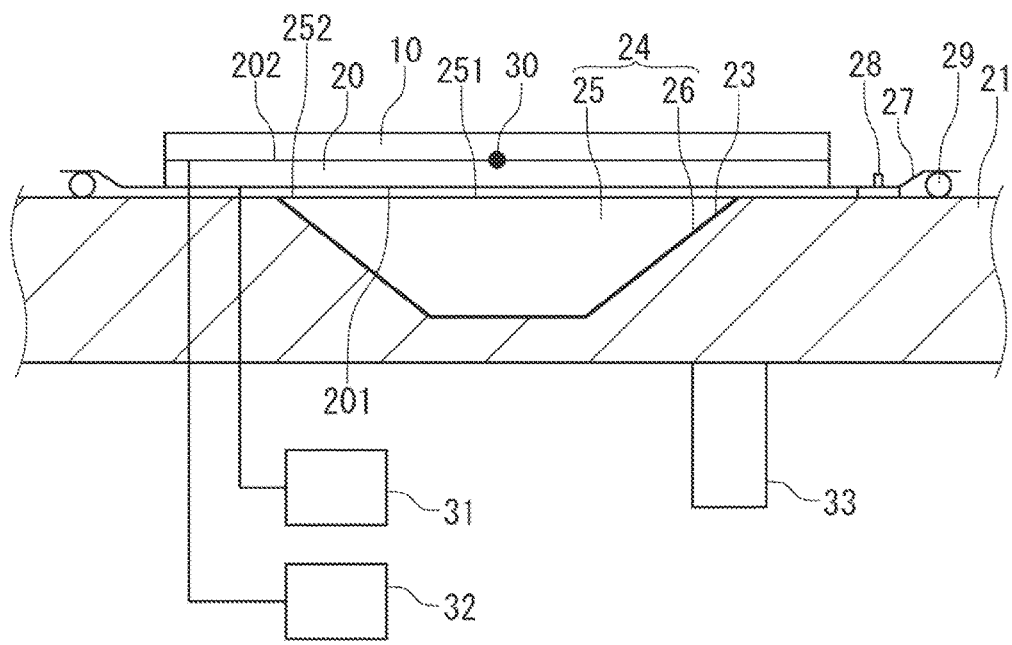
FIG. 2A is a view illustrating how a repair material is disposed on a skin of an aircraft and the skin is repaired using a heater mat and a heat dispersion device.

The skin 21 shown in FIG. 2A is formed from a fiber-reinforced plastic. The damage caused in the skin 21 is removed in a proper form after the condition is checked by ultrasonic inspection etc. (removing step S1). The damage in this embodiment is cut off by scarfing, which leaves a cone-shaped (truncated cone-shaped) recessed part 23 formed in the skin 21.

Any foreign substance on the inner peripheral surface of the recessed part 23 is removed by washing, and the surface is processed to a condition suitable for adhesion.

After the recessed part 23 is formed, the repair material 24 for covering the recessed part 23 is prepared and is disposed on the recessed part 23 (repair patch disposing step S2).

The repair material 24 includes a repair patch 25 (repair plug), which is a main body of the repair material, and a film-like adhesive 26 which joins the repair patch 25 to the skin 21.

The repair patch 25 is formed by impregnating a fiber base material with a thermosetting resin and heating the thermosetting resin to cure.

The fiber base material can be formed, for example, of carbon fiber, glass fiber, etc.

Examples of the thermosetting resin include epoxy, polyimide, polyurethane, and unsaturated polyester.

The repair patch 25 can be selected from a prepreg and a pre-cured material (pre-cured patch) according to the degree of the damage, the required rigidity, the skills of the worker, etc.

The prepreg is an intermediate material obtained by impregnating a fiber base material (preform), which is a fiber shaped into a sheet form, with a thermosetting resin, and is easy to process as the resin is uncured.

The repair patch 25 of this embodiment is produced in a truncated conical shape that fits the shape of the recessed part 23 by using a prepreg formed from a fiber base material and a thermosetting resin similar to those used for the skin 21.

On the other hand, the pre-cured patch is obtained by impregnating a fiber base material with a thermosetting resin and heating the thermosetting resin to cure in advance. Pre-cured patches have a finite shape (typically circular plate-like shape) and are available in several different sizes, and a suitable one is selected according to the size of the damage.

The film-like adhesive 26 is formed of a thermosetting resin such as epoxy, polyimide, polyurethane, unsaturated polyester, etc.

The film-like adhesive 26 is inserted between the repair patch 25 and the skin 21 by being disposed on the bottom and the inner peripheral surface of the recessed part 23.

This embodiment also embraces the technique of forming the repair material 24 inside the recessed part 23 and at the same time joining it to the object to be repaired (skin 21) by the hand lay-up method in which the fiber base material is stacked inside the recessed part 23 while being impregnated with the thermosetting resin and the thermosetting resin is heated to cure.

Next, the repair patch 25 and the surrounding skin 21 are covered with a vacuum film 27, and a vacuum pump (not shown) is connected with a valve 28 provided in the vacuum film 27. The space between the vacuum film 27 and the skin 21 is sealed with a sealant material 29 disposed annularly around the repair patch 25.

Then, the vacuum pump is actuated and the inside of the recessed part 23 positioned on the inside of the vacuum film 27 is depressurized (depressurizing step S3). As a result, the repair patch 25 is compressed and densified due to the differential pressure between the pressure inside the vacuum film 27 and the atmospheric pressure on the outside.

It is preferable that the depressurized state is maintained also during the subsequent heating of the repair material 24.

Next, the heater mat 20 is disposed through the vacuum film 27 on an area including the repair patch 25 and the surrounding area (heater mat disposing step S4).

The heater mat 20 is a rectangular mat formed from a rubber material such as silicone rubber and has a built-in heater as a heat source (heating wire etc.). The heater mat 20 is flexible enough to follow the shape of even the curved surface of the skin 21. It is also possible to mix a fiber into the rubber material for improving the durability.

The heater mat 20 has a first surface 201 to be directed toward the object to be heated and a second surface 202 opposite to the first surface 201, and the heater mat is disposed with the first surface 201 facing the repair patch 25 (object to be heated).

The heater mat 20 is connected with a first control unit 31 which can adjust the output.

Further, the heat dispersion device 10 is disposed on top of the second surface 202 of the heater mat 20 (heat dispersion device disposing step S5).

During this step, a temperature sensor 30 which can be used for controlling the output adjustment of each of the heater mat 20 and the heat dispersion device 10 is disposed between the heater mat 20 and the heat dispersion device 10. In this embodiment, the temperature sensor 30 is disposed at the position corresponding to a central part 251 of the repair patch 25, but instead the temperature sensor 30 can also be disposed in an edge part 252 of the repair patch 25.

By means of the temperature measured by this temperature sensor 30, the output adjustment of the heater mat 20 is performed by the first control unit 31 and the output adjustment of the internal heater 14 of the heat dispersion device 10 is performed by a second control unit 32.

For example, a thermocouple may be used as the temperature sensor 30.

Figure 2B:
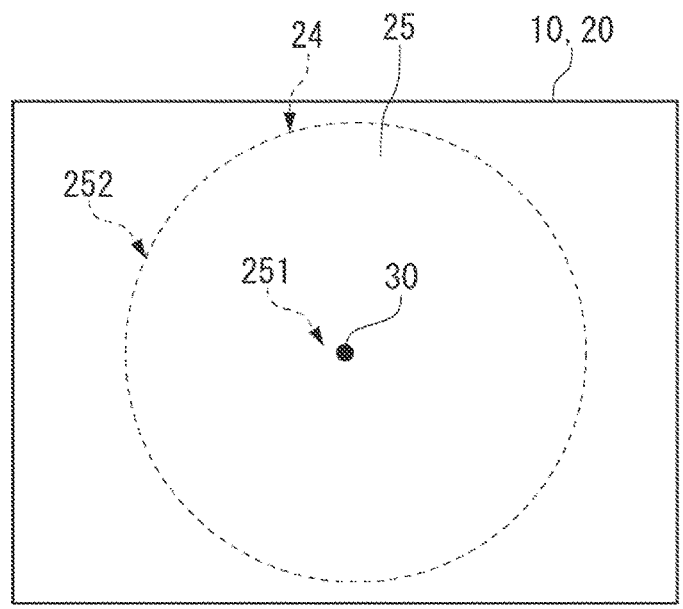
FIG. 2B is a view illustrating how the repair material is disposed on the skin of an aircraft and the skin is repaired using the heater mat and the heat dispersion device.

Since the heat dispersion device 10 has substantially the same dimensions and shape as those of the heater mat 20, it can be placed over the entire surface of the second surface 202 of the heater mat 20 (see the plan view FIG. 2B). Then, the bag 12 comes into close contact with the second surface 202 of the heater mat 20.

The heat dispersion device 10 is connected with the second control unit 32 capable of adjusting the output.

Next, the heater mat 20 is energized and the repair material 24 is heated (heating step S6).

In this heating step S6, the fluid 11 is heated with the internal heater 14 of the heat dispersion device 10, and the fluid 11 is circulated along the circuit 13 with the pump 16.

The actuation of the internal heater 14 and the pump 16 may be started at any timing, and does not have to coincide with the start of heating of the heater mat 20 but may be before or after that. It is also effective to preheat the fluid 11 by actuating the internal heater 14 before the heating step S6.

The temperature control by means of the temperature sensor 30, the first control unit 31, and the second control unit 32 will be described later.

Once the repair material 24 is heated to reach a temperature required for curing, the thermosetting resins contained in the repair patch 25 and the film-like adhesive 26 are cured.

Here, if the plate thickness of the skin 21 is uniform in the heating area covered by the heater mat 20, since the heat capacity is even over the entire heating area including the central part 251 and the edge part 252, the heat generated from substantially the entire first surface 201 of the heater mat 20 is uniformly conducted in the heating area. If the heater mat 20 having an output suitable to the thickness of the repair material 24 is used, since the temperature gradient in the thickness direction due to the distance from the first surface 201 of the heater mat 20 is small, the repair material 24 is heated across the entire thickness.

However, if the plate thickness varies in the heating area, the temperature in an area of a larger plate thickness is not raised easily by the same heat input as in the other areas due to the larger heat capacity.

Also in the case where the heating area includes a part where nothing is provided on the rear side of the skin 21 and a part where an object 33 such as a rib, a stringer, or an accessory is provided, the temperature in the area where the object 33 is provided is not raised easily by the same heat input as in the other areas due to the larger heat capacity.

If the performance of the heater mat 20 is significantly high so that the heat capacity of the area where the plate thickness of the skin 21 is large or the area where the object 33 is provided on the rear side of the skin 21 does not matter, no temperature difference would occur in the heating area; however, as long as the heater mat 20 having a realistic output is used, a temperature difference can occur in the heating area even when heat is uniformly generated from the first surface 201 of the heater mat 20.

Other than the above-described reasons, the temperature difference in the heating area can also occur for the reason that the heat is dissipated from the side surface of the heater mat 20 or the surface of the skin 21 to the outside air in the edge part of the heating area.

Moreover, where the repair patch 25 is formed to be thick so as to fill the entire recessed part 23, the temperature difference in the heating area can also occur for the reason that the heat (reaction heat) generated as the thermosetting cures tends to be accumulated at the central part 251 of the repair patch 25.

Thus, it is difficult to uniformly heat the repair material 24 even if heat is uniformly input from the heater mat 20 to substantially the entire surface of the repair patch 25.

Therefore, a conceivable measure is, before the repair, to dispose the repair patch 25 inside the recessed part 23 through a separable film for preventing adhesion, measuring the temperature with the temperature sensor in a plurality of areas of the heating area, and disposing a heat insulating material in those areas where the heat is insufficient. A heat dissipation fin may be disposed in those areas where heat is concentrated.

Since the temperature difference in the heating area occurs mainly due to the change in plate thickness of the skin 21 or the presence or absence of a structure etc. on the rear side of the skin 21, the method of measuring the temperature at the actual repair position is valid.

However, it takes a lot of time and effort to determine the suitable position and the size of the heat insulating material by repeatedly performing temperature measurement with the different position and size of the heat insulating material.

Moreover, the possibility of a temperature difference occurring in the heating area attributable to the difference between the ambient temperatures during the prior temperature measurement and during the actual repair, promotion of heat dissipation due to the removal of the release film, or a temperature measurement error, etc. cannot be eliminated.

Therefore, in this embodiment, the heat dispersion device 10 is used to ultimately solve the problem of the temperature difference occurring in the heating area.

Heat is conducted from the second surface 202 of the heater mat 20 to the heat dispersion device 10. This causes the fluid 11 inside the bag 12 located near the second surface 202 to expand and become lower in density compared with the fluid 11 above, so that buoyancy is generated due to the difference in density.

Since the heat dispersion device 10 is thermally coupled with the repair material 24 through the heater mat 20, a temperature difference corresponding to that in the heating area also occurs in the heat dispersion device 10. Therefore, the fluid 11 expands more and becomes lower in density in areas where the temperature is relatively high than in other areas where the temperature is low.

Thus, convection of fluid 11 occurs between high-temperature areas and low-temperature areas.

When the temperature of the fluid 11 inside the bag 12 is averaged due to the convection, transfer of heat occurs in the repair material 24 which is thermally coupled with the heat dispersion device 10 through the heater mat 20.

For example, when the temperature of the central part 251 of the repair patch 25 is relatively high and the temperature of the edge part 252 of the repair patch 25 is relatively low, the heat is dissipated in the central part 251 from the repair patch 25 to the fluid 11, while the heat is transferred from the fluid 11 to the repair patch 25 in the edge part 252.

Then, as the heat of the central part 251 of the repair patch 25 is dispersed to the edge part 252 through the fluid 11, the heat distribution of the repair material 24 is uniformized.

Moreover, since the heat dispersion device 10 is placed on top of the heater mat 20, the heat dissipation from the second surface 202 of the heater mat 20 can be prevented, so that the heating efficiency can be improved.

Thus, when the heat distribution is uniformized by the heat dispersion device 10 as described above, the entire repair material 24 reaches the temperature required for curing the thermosetting resin. By heating the repair material 24 until the thermosetting resin has been cured, the entire repair patch 25 is cured and the entire film-like adhesive 26 is cured to form an adhesive layer, so that the repair patch 25 is joined to the skin 21 through the adhesive layer.

Thus the repair of the skin 21 is completed.

According to this embodiment, the heat distribution can be uniformized by the heat dispersion device 10 without the need for the preparatory work of trying the arrangement of heat insulating material on the basis of the thermal distribution survey.

Therefore, it is possible to perform a high-quality repair by immediately starting the repair and quickly raise the temperature of the entire repair material 24 to the temperature required for curing the thermosetting resin.

In this embodiment, since the fluid 11 inside the bag 12 is heated with the internal heater 14, the heat generated from the heater mat 20 is not absorbed by the fluid 11, and the performance of the heater mat 20 can be maintained.

Further, as the fluid 11 is guided by the circuit 13 inside the bag 12, the flow of the fluid 11 is promoted, so that the heat distribution can be more efficiently uniformized.

Moreover, in this embodiment, since the fluid 11 is forced to flow by the pump 16, the heat dispersion through the flow of the fluid 11 inside the bag 12 is promoted, so that the heat distribution can be more efficiently uniformized.

In addition, in this embodiment, temperature control can be performed by using the temperature sensor 30, the first control unit 31, and the second control unit 32.

Here, a target temperature at the installation position of the temperature sensor 30 is set on the first control unit 31 according to the temperature required for curing the thermosetting resin contained in the repair material 24. Here, the target temperature in the first control unit 31 is 150° C. The first control unit 31 performs feedback control so as to eliminate a deviation of the measured temperature from the target temperature.

Therefore, if the temperature sensor 30 measures 170° C., the first control unit 31 lowers the output of the heater mat 20 so that the temperature falls to 150° C.; however, it is assumed that the temperature measured by the temperature sensor 30 is still above 150° C.

In that case, the second control unit 32 turns off the power to the internal heater 14 or lowers the output of the internal heater 14. Then, the heat of the heater mat 20 is absorbed by the fluid 11 which is lowered in temperature, and the temperature of the repair material 24 can be lowered. As the temperature of the repair material 24 decreases, the temperature measured by the temperature sensor 30 also decreases.

Thereafter, if the temperature measured by the temperature sensor 30 is below the target temperature, the second control unit 32 turns on the power to the internal heater 14 or increases the output of the internal heater 14.

Conversely to the above case, if the temperature measured by the temperature sensor 30 is below the target temperature, the first control unit 31 increases the output of the heater mat 20. If the measured temperature does not yet reach the target temperature, the second control unit 32 increases the output of the internal heater 14 to thereby assist the heating of the heater mat 20.

Thus, if the second control unit 32 which adjusts the energization and the output of the internal heater 14 is provided, even if an event of a deviation from the output adjustment range of the heater mat 20 occurs at a repair site where a wide range of the ambient temperature is expected, it is possible to continue the repair by just operating the second control unit 32 without changing the device configuration of the heater mat 20 and the heat dispersion device 10, etc. installed at the repair position.

The temperature sensor 30 used for the temperature control can be disposed between the repair patch 25 and the heater mat 20, but in order to prevent the temperature sensor 30 from being printed on the surface of the repair patch 25 for which an uncured prepreg is used, the temperature sensor 30 is preferably disposed between the heater mat 20 and the heat dispersion device 10 as in this embodiment.

It is also possible to turn on and off the power to the internal heater 14 or variably adjust the output of the internal heater 14 in order to maintain the temperature of the fluid 11 within a predetermined range by the second control unit 32. In that case, the temperature sensor for measuring the temperature of the fluid 11 may be provided inside the bag 12 and feedback control may be performed using the measured temperature.

The performance of the pump 16 can also be variably controlled in combination with the temperature control of the fluid 11 or independently from it.

In that case, it is preferable that the temperatures at a plurality of positions inside the bag 12 are measured with the temperature sensor.

For example, if there is a large difference between the temperatures measured at a position corresponding to the central part 251 of the repair patch 25 and at a position corresponding to the edge part 252 of the repair patch 25, the performance of the pump 16 should be increased by a control part which variably controls the rotation of the pump 16. Then, the flow of the fluid 11 inside the bag 12 is promoted, so that the temperature difference between the central part 251 and the edge part 252 can be eliminated at an early time.

The above-described temperature control can also be separately performed on each of the plurality of regions set inside the bag 12.

Figure 4:
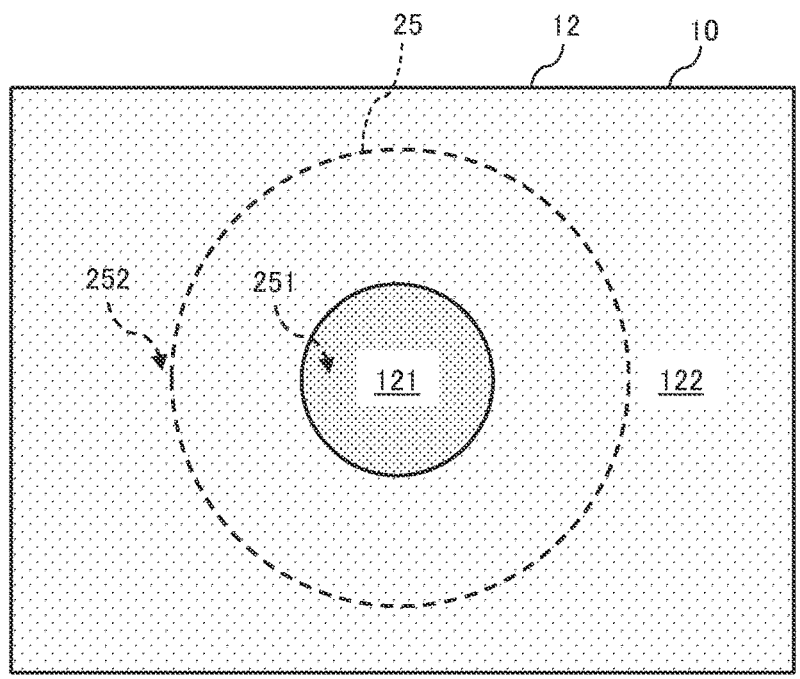
FIG. 4 is a view showing an example where the inside of a bag is divided into a plurality of regions.

For example, suppose that the inside of the bag 12 is divided into a central region 121 located at the center of the plane of the bag 12 and a surrounding region 122 located on the outside of the central region 121 as shown in FIG. 4.

The central region 121 faces the central part 251 of the repair patch 25.

The surrounding region 122 faces the edge part 252 of the repair patch 25.

The second control unit 32 controls the temperature of the fluid 11 sealed in each of the central part 251 and the edge part 252 using the temperature measured by the temperature sensor which is provided in each region.

Dividing the inside of the bag 12 into the central region 121 and the surrounding region 122 as described above is advantageous when there is a large temperature difference between the central part in the plane, where the heat tends to accumulate, and the surrounding part. It is possible to efficiently uniformize the heat distribution and make a repair by circulating the fluid 11 at a low temperature in the central region 121 so as to dissipate the heat of the central part in the plane while circulating the fluid 11 at a higher temperature in the surrounding region 122 to secure the required temperature.

The inside of the bag 12 can be divided in any form according to the expected temperature distribution.

Figure 5:
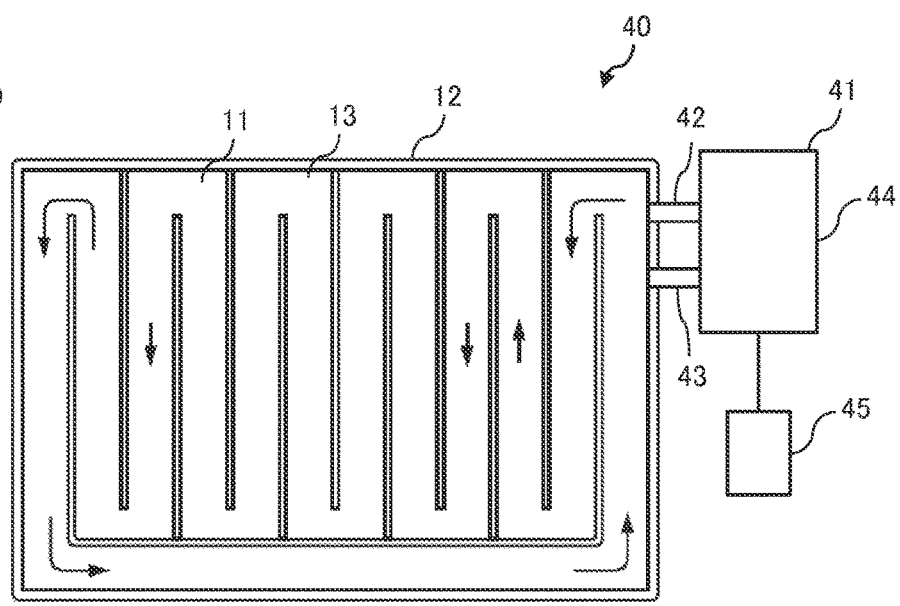
FIG. 5 is a view showing an example where the heat dispersion device is connected with an external heat source.

FIG. 5 shows a heat dispersion device 40 according to a modified example of the present invention.

The heat dispersion device 40 is connected with an external heater 41 for heating the fluid 11, instead of having the above-described internal heater 14 built in.

The external heater 41 includes: a case 44 which is connected with the heat dispersion device 40 through an outlet part 42, which discharges the fluid 11 from the inside of the bag 12, and an inlet part 43, which sends the fluid 11 into the bag 12; a heating wire (not shown) provided inside the case 44; and a control unit 45 which controls the temperature of the fluid 11 inside the case 44.

A pump is provided as necessary inside the case 44. This pump can double as the above-described pump 16 (FIG. 1B).

The control unit 45 controls the temperature of the fluid 11 using the temperature measured by the temperature sensor provided inside the case 44. The control unit 45 can be used instead of the above-described second control unit 32.

When the repair material 24 is heated by the heater mat 20, the heating wire of the external heater 41 is energized, and where the external heater 41 is provided with a pump, the pump is also actuated.

The external heater 41 heats the fluid 11, which is suctioned from the inside of the bag 12 through the outlet part 42 into the case 44, with the heating wire and returns the fluid 11 through the inlet part 43 into the bag 12.

In this way, the heat generated from the heater mat 20 is not absorbed by the fluid 11, so that the performance of the heater mat 20 can be maintained.

Figure 6A:
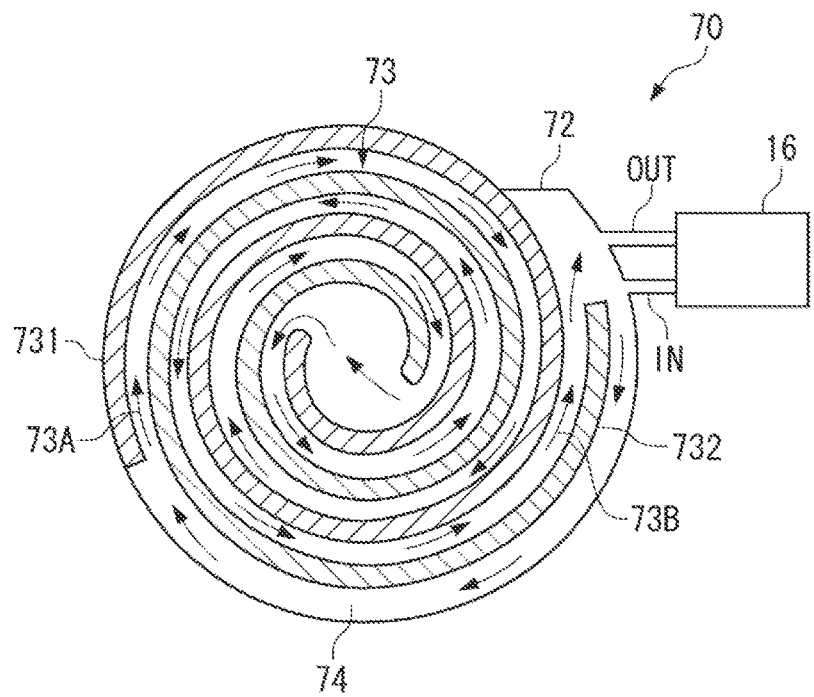
FIG. 6A is a plan view showing an example where a spiral circuit is formed in the heat dispersion device, with an outward path and a return path being disposed in the same plane.

FIG. 6A shows a heat dispersion device 70 according to another modified example. A spiral circuit 73 is formed inside a bag 72 equipped in the heat dispersion device 70. A pair of spiral peripheral walls 731 and 732 are provided inside the bag 72. As these peripheral walls 731 and 732 are disposed so as to mesh with each other 180° out of phase, an outward path 73A which extends toward the inner peripheral side while circling inside the bag 72, and a return path 73B which extends to the outer peripheral side while circling inside the bag 72 are formed.

The pump 16 which is inserted into the circuit 73 is connected on one end side of the bag 72. The pump 16 suctions the fluid 11 flowing through the return path 73B and pushes it out into the outward path 73A. The pump 16 is connected with one of the outward path 73A and the return path 73B (here, with the outward path 73A) through a route 74 along the outer periphery of the bag 72.

When the circuit 73 is formed in a spiral shape, as the fluid 11 flows from the outer peripheral side to the inner peripheral side, and again to the outer peripheral side while passing the entire surface of the bag 72 along the circuit 73, the heat which tends to accumulate in the center of the plane can be efficiently dispersed to the surrounding area.

The shape of the bag 72 is not limited to a circular shape, but may be a rectangular shape. The spiral form of the circuit 73 can also be simulated with a straight line and modified into a rectangular shape (see FIG. 6C).

Figure 6B:
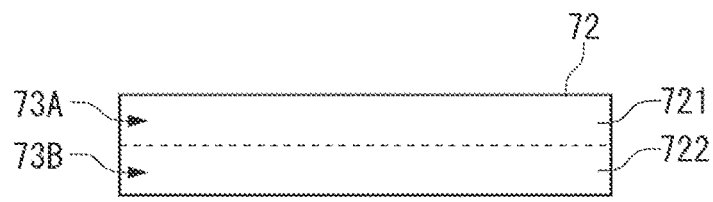
FIG. 6B is a side view showing the example where the spiral circuit is formed in the heat dispersion device, with the outward path and the return path being disposed in an upper layer and a lower layer inside the bag.
Figure 6C:
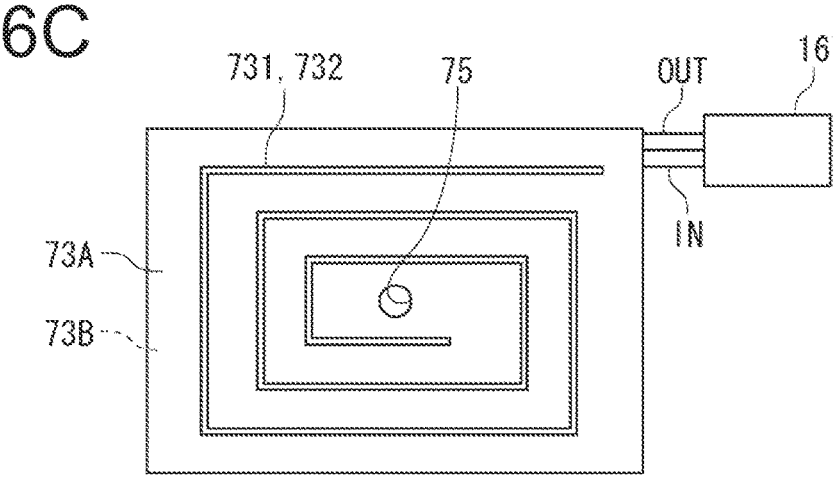
FIG. 6C is a plan view showing the example where the spiral circuit is formed in the heat dispersion device, with the outward path and the return path being disposed in the upper layer and the lower layer inside the bag.

As shown in FIG. 6B, it is also possible to divide the inside of the bag 72 into two parts in the thickness direction, and, for example, to dispose the outward path 73A in an upper layer 721 and the return path 73B in a lower layer 722. In that case, as shown in FIG. 6C, the spiral peripheral walls 731 and 732 can be disposed in the same phase. The outward path 73A and the return path 73B can be connected through a hole 75 provided at the center of the spiral.

The heat dispersion device of the present invention can also be used for joining members together, other than the above-described repair.

Figure 7:
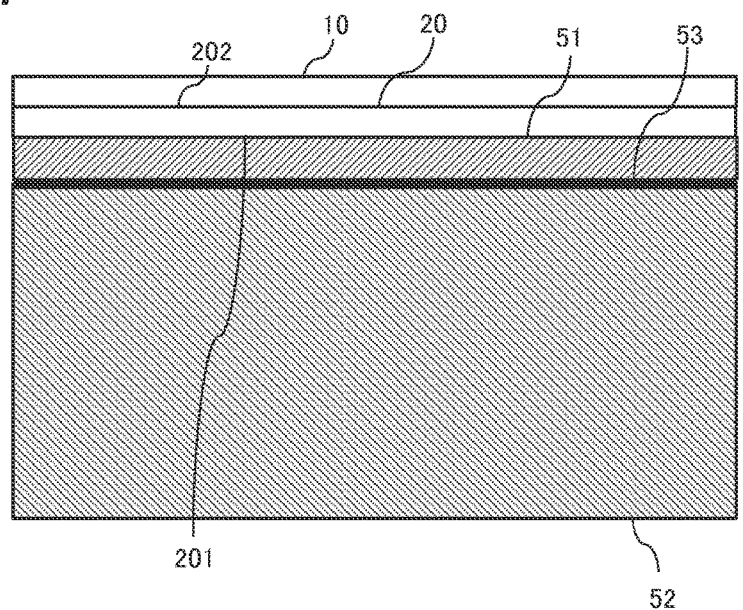
FIG. 7 is a view illustrating how members are joined with each other using the heater mat and the heat dispersion device.
Figure 8:
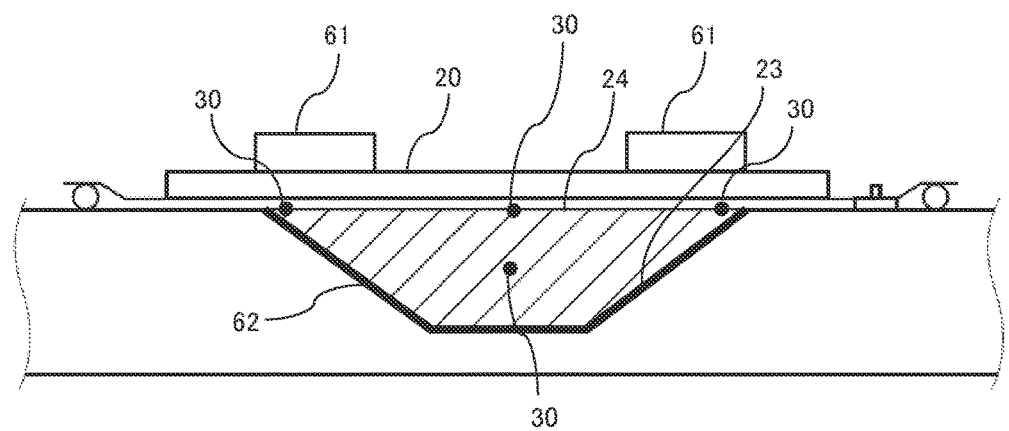
FIG. 8 is a view illustrating a preparatory work performed before the repair.

As shown in FIG. 7, a first member 51 and a second member 52 are joined with an adhesive 53 formed from a thermosetting resin.

Here, the first member 51 and the second member 52 are plate-like members of the same dimensions, and the thickness of the second member 52 is smaller than that of the first member 51.

The shape of the first member 51 and the second member 52 is not limited to the plate-like shape but may be of any form. In addition, these members may be different from each other in dimensions.

In this example, the first member 51 is placed on top of the second member 52, and the first member 51 and the second member 52 are joined together through the adhesive 53 disposed on the interface between the first member 51 and the second member 52.

When joining the first member 51 and the second member 52, first, the adhesive 53 is disposed between the first member 51 and the second member 52 (adhesive disposing step). For example, a liquid thermosetting adhesive can be applied, or a thermosetting adhesive molded into a film-like shape can be sandwiched between the first member 51 and the second member 52.

Next, the heater mat 20 is disposed, with the first surface 201 side down, on the first member 51 (heater mat disposing step). The heater mat 20 having the length and the width equivalent to those of the first member 51 is used.

Further, the heat dispersion device 10 is placed on the second surface 202 of the heater mat 20 (heat dispersion device disposing step). Instead of the heat dispersion device 10, the heat dispersion device 40 (FIG. 5) may be used.

Then, the adhesive 53 is heated through the first member 51 by the heater mat 20 (heating step).

Even if a temperature difference occurs in the heating area of the heater mat 20 during the heating, as with the above-described embodiment, the heat is dispersed from an area at a relatively higher temperature to an area at a lower temperature through the flow of the fluid 11 inside the bag 12 of the heat dispersion device 10, the adhesive 53 is uniformly heated. Then, the thermosetting resin can be cured over the entire adhesive 53.

It is possible to make a selection of the configurations presented in the above-described embodiments or appropriately change the configurations into other configurations within the scope of the present invention.

The heat dispersion device of the present invention can also be disposed in only a part of the region of the second surface 202 of the heater mat 20.

However, it is desirable to dispose the heat dispersion device in an area including an area where a relatively higher temperature is expected and an area where a lower temperature is expected, in order to uniformize the heat distribution through the flow of the fluid 11.

According to the heat dispersion device of the present invention, it is possible to eliminate the preparatory work of determining the arrangement of the heat insulating material on the basis of the heat distribution survey. Thus, it is not absolutely necessary to conduct the heat distribution survey which is essential where the heat insulating material is disposed. However, the heat distribution survey may be conducted when a member is repaired or joined using the heat dispersion device of the present invention. For example, it is possible to determine the performance and the size of the heater mat 20, the size of the heat dispersion device 10, the amount of the fluid 11 to be sealed, etc. by the heat distribution survey.

A bag formed of two films sealed at the edge part may be adopted as the bag equipped in the heat dispersion device of the present invention. Also in that case, the fluid 11 sealed inside the films can be circulated along the circuit by disposing a structure forming the circuit between the films.

In the above-described embodiments, the heat dispersion device 10 is connected with the pump 16 in order to force the fluid 11 inside the bag 12 of the heat dispersion device 10 to flow; however, the present invention also embraces the case where an impeller etc. which stirs the fluid 11 inside the bag 12 is provided instead of the pump 16.

The member to be repaired by the repair method of the present invention, or the member joined by the joining method of the present invention, can be formed from any material including a fiber-reinforced plastic and a metal material. Moreover, it is also possible to repair or join members having a sandwich structure with a core material such as a honeycomb core sandwiched between plate materials, other than members formed of a single raw material.

The repair material used in the repair method of the present invention can also be formed from any material including a fiber-reinforced plastic and a metal material.

The present invention also embraces the use of a thermoplastic resin, such as nylon, polyethylene, polystyrene, or polyvinyl chloride, as a resin which is cured by heating.

In the present invention, it is also effective to dispose the heat dispersion device also on the first surface of the heater mat, which is directed toward the object to be heated, so as to sandwich the heater mat between this heat dispersion device and the heat dispersion device disposed on the second surface. The performance of heat insulation, heat dissipation, and heat dispersion can be improved by using two heat dispersion devices.

What is claimed is:

1. A heating apparatus for heating an object that comprises:
    a heater mat;
    a heat dispersion device comprising a bag with a fluid sealed inside of the bag;
    an internal heat source inside the bag which heats the fluid; and
    a flow forcing part which forces the fluid to flow,
    wherein the heat dispersion device is disposed on a surface of the heater mat.

2. The heating apparatus according to claim 1, wherein the bag includes a circuit in which the fluid circulates.

3. The heating apparatus according to claim 2, wherein the circuit has a spiral shape, and forms a flow which moves toward an inner peripheral side while circling inside the bag, and a flow which moves toward an outer peripheral side while circling inside the bag.

4. The heating apparatus according to claim 2, wherein the bag comprises:
    one or more outer walls that define an enclosure in which the fluid resides, and
    an inner wall provided within the enclosure,
    wherein the inner wall and the one or more outer walls at least partially define the circuit in which the fluid circulates.

5. The heating apparatus according to claim 1, wherein the bag has a plate-like outline, and is placed over substantially the entire surface of the heater mat.

6. The heating apparatus according to claim 1, wherein the object to be heated is an aircraft member constituting an aircraft or a repair material used for repairing the aircraft member.

7. The heating apparatus according to claim 1, wherein the bag includes a circuit in which the fluid circulates and the internal heat source is provided so as to meander along the circuit.

8. The heating apparatus according to claim 1, wherein the heater mat is connected to a control unit configured to energize the heater mat to generate heat.

9. The heating apparatus according to claim 1, wherein the heater mat has an opposite surface that is opposite to the surface of the heater mat, the opposite surface being directed toward an object to be heated.

10. The heating apparatus according to claim 1, further comprising a temperature sensor disposed between the heater mat and the heat dispersion device.

11. The heating apparatus according to claim 10, further comprising a control system connected to the heater mat and heat dispersion device and configured to adjust an output of the heater mat and heat dispersion device based on a temperature measured by the temperature sensor.

12. The heating apparatus according to claim 1, wherein the flow forcing part includes an inlet passage and an outlet passage, and suctions the fluid from the inside of the bag through the outlet passage and pushes the suctioned fluid through the inlet passage to the inside of the bag so that the fluid is forced to flow.

13. A heating apparatus for heating an object that comprises:
    a heater mat;
    a heat dispersion device comprising a bag with a fluid sealed inside of the bag; and
    an internal heat source inside the bag which heats the fluid,
    wherein the heat dispersion device is disposed on a surface of the heater mat, and
    wherein the bag extends along a plane and an inside of the bag is divided into a central region located near a center of the plane and a surrounding region located outside of the central region along the plane, further wherein the heat dispersion device is configured such that a temperature of the fluid is controlled based on at least one of a temperature of the central region and a temperature of the surrounding region.

14. A heating apparatus for heating an object that comprises:
    a heater mat;
    a heat dispersion device comprising a bag with a fluid sealed inside of the bag;
    an internal heat source inside the bag which heats the fluid; and
    a pump which forces the fluid to flow,
    wherein the heat dispersion device is disposed on a surface of the heater mat.

15. The heating apparatus according to claim 14, wherein the pump is connected to one end of the bag and suctions the fluid from an inside of the bag and pushes the suctioned fluid to the inside of the bag so that the fluid is forced to flow.

16. A repair method using the heating apparatus according to claim 1, comprising the steps of:
    disposing a repair material containing a resin, which is cured by heating, on a member which is an object to be repaired;
    disposing the heat dispersion device on the surface of the heater mat; insert directing another surface of the heater mat toward the repair material and covering the repair material with the heater mat; and
    heating the repair material with the heater mat.

17. The repair method according to claim 16, wherein, in the step of heating the repair material:
    the fluid is heated with the internal heat source, and
    the fluid is forced to flow.

18. The repair method according to claim 16, wherein the repair material includes a prepreg formed from a thermosetting resin and a fiber base material.

19. The repair method according to claim 16, wherein the member is an aircraft member constituting an aircraft.

20. A joining method using the heating apparatus according to claim 1, comprising the steps of:
    disposing an adhesive containing a resin, which is cured by heating, between a first member and a second member to be joined together;
    disposing the heater mat on at least one of the first member and the second member;
    disposing the heat dispersion device on the surface of the heater mat; and
    heating the adhesive with the heater mat.

* * * * *

UNITED STATES PATENT AND TRADEMARK OFFICE
CERTIFICATE OF CORRECTION

PATENT NO.         : 10,336,020 B2
APPLICATION NO.    : 14/568279
DATED              : July 2, 2019
INVENTOR(S)        : Toshikazu Shigetomi et al.

Page 1 of 1

It is certified that error appears in the above-identified patent and that said Letters Patent is hereby corrected as shown below:

In the Claims

Number 12, Column 16, Line 1, "from the inside" should read --from an inside--.

Number 16, Column 16, Line 42, "heater mat; insert directing another surface of the heater" should read --heater mat; directing another surface of the heater--.

Signed and Sealed this
Twenty-ninth Day of October, 2019

Andrei Iancu
*Director of the United States Patent and Trademark Office*